United States Patent
Perraud et al.

(10) Patent No.: US 8,213,343 B2
(45) Date of Patent: Jul. 3, 2012

(54) COMMUNICATING CONVERSATIONAL DATA BETWEEN SIGNALS BETWEEN TERMINALS

(75) Inventors: Eric Perraud, Tournefeuille (FR); Christophe Comps, Cugnaux (FR)

(73) Assignee: Freescale Semiconductor, Inc., Austin, TX (US)

( * ) Notice: Subject to any disclaimer, the term of this patent is extended or adjusted under 35 U.S.C. 154(b) by 1804 days.

(21) Appl. No.: 10/550,698

(22) PCT Filed: Mar. 15, 2004

(86) PCT No.: PCT/EP2004/050311
§ 371 (c)(1),
(2), (4) Date: Sep. 27, 2005

(87) PCT Pub. No.: WO01/08426
PCT Pub. Date: Feb. 1, 2001

(65) Prior Publication Data
US 2006/0193269 A1    Aug. 31, 2006

(30) Foreign Application Priority Data
Mar. 27, 2003    (EP) .................................... 03290771

(51) Int. Cl.
*H04B 7/005* (2006.01)

(52) U.S. Cl. ........................................ 370/278; 370/294

(58) Field of Classification Search ................. 370/347, 370/337, 278, 294, 293, 296; 704/210–215, 704/233
See application file for complete search history.

(56) References Cited

U.S. PATENT DOCUMENTS

| | | | |
|---|---|---|---|
| 5,392,276 A * | 2/1995 | Tran | 370/294 |
| 5,737,407 A * | 4/1998 | Graumann | 379/388.04 |
| 5,867,574 A * | 2/1999 | Eryilmaz | 379/388.04 |
| 5,870,397 A * | 2/1999 | Chauffour et al. | 370/435 |
| 6,108,413 A * | 8/2000 | Capman et al. | 379/406.13 |
| 6,269,331 B1 | 7/2001 | Alanara et al. | |
| 6,393,000 B1 * | 5/2002 | Feldman | 370/316 |
| 6,453,041 B1 * | 9/2002 | Eryilmaz | 379/392.01 |
| 6,711,584 B1 * | 3/2004 | Wajda et al. | 707/104.1 |

(Continued)

FOREIGN PATENT DOCUMENTS

EP    1261176 A    11/2002

(Continued)

OTHER PUBLICATIONS

Digital Cellular Telecommunications System: Discontinuous Transmission (DTX) for Enhanced Full Rate (EFR) Speech Traffic Channels (GSM 06.81); European Telecommunication Standard; Nov. 1996, pp. 1-15 XP-002098616.

(Continued)

*Primary Examiner* — Chuong T Ho

(57) ABSTRACT

A method of and apparatus for communication of conversational data signals, especially voice signals, between transceiver terminals over a radio link, especially a Bluetooth link, capable of full-duplex transmission of conversational data packets in alternate directions within a pair of time slots. Local conversational activity is detected at each of the terminals and conversational activity signals indicative of the detected local conversational activity are sent to the other terminal. Reception at either terminal is disabled if conversational activity signalling indicates absence of remote conversational activity, and transmission by either terminal is disabled in the absence of local conversational activity, saving power. Audible comfort noise may be generated at the terminal from a locally generated comfort noise signal if reception is disabled in response to the conversational activity signalling indicating absence of remote conversational activity.

17 Claims, 3 Drawing Sheets

U.S. PATENT DOCUMENTS

| | | | |
|---|---|---|---|
| 6,754,620 B1 * | 6/2004 | Bauer | 704/214 |
| 6,981,174 B1 * | 12/2005 | Hanning | 714/5 |
| 7,146,314 B2 * | 12/2006 | Wang | 704/233 |
| 7,464,029 B2 * | 12/2008 | Visser et al. | 704/210 |
| 7,983,907 B2 * | 7/2011 | Visser et al. | 704/227 |
| 2002/0172185 A1 * | 11/2002 | Mito et al. | 370/347 |
| 2008/0306736 A1 * | 12/2008 | Sanyal et al. | 704/233 |

FOREIGN PATENT DOCUMENTS

| | | | |
|---|---|---|---|
| GB | 2345213 | * | 6/2000 |
| JP | 11154912 A | | 6/1999 |
| JP | 11252001 A | | 9/1999 |
| JP | 2003087185 A | | 3/2003 |
| WO | 0074350 A2 | | 12/2000 |
| WO | WO 01/08426 A | | 2/2001 |
| WO | 0205593 A2 | | 1/2002 |
| WO | 0241606 A1 | | 5/2002 |

OTHER PUBLICATIONS

EPC Application No. SC12528ET/EPC/F; European Search Report mailed Oct. 7, 2003.

* cited by examiner

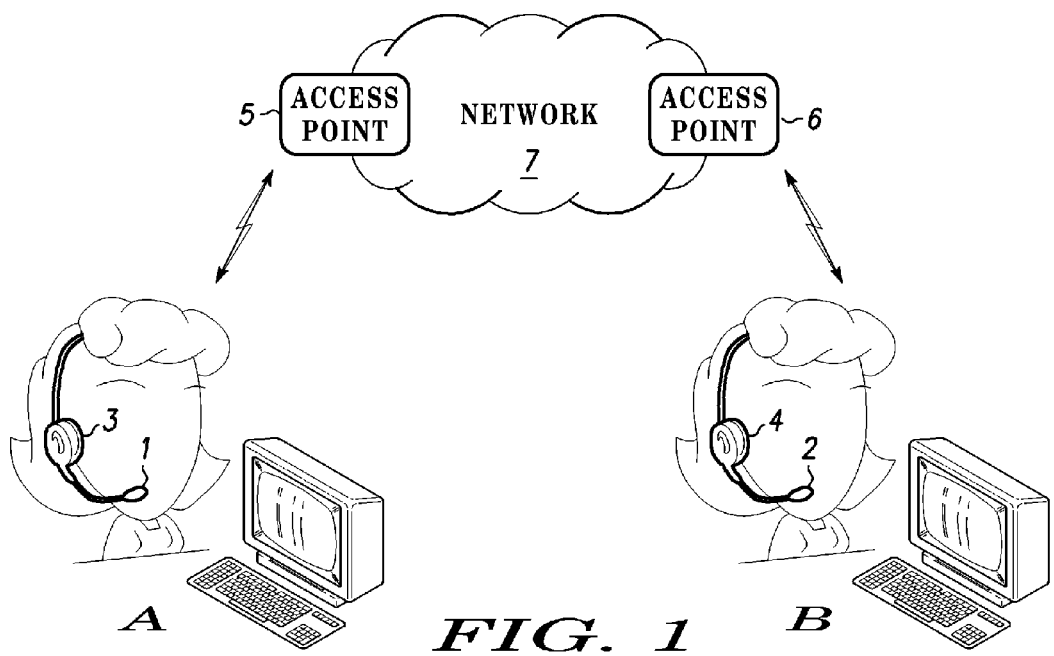
FIG. 1
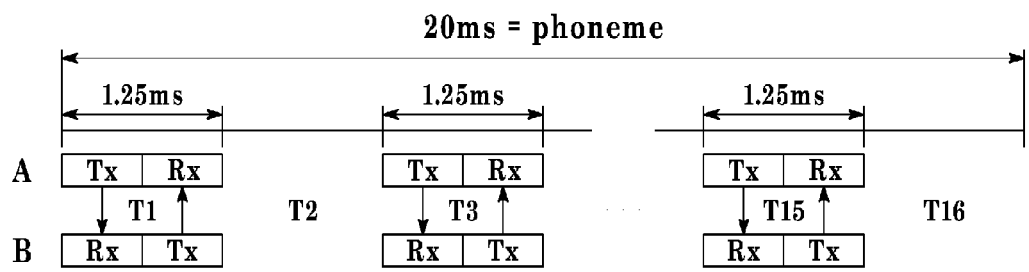
- PRIOR ART -  FIG. 2
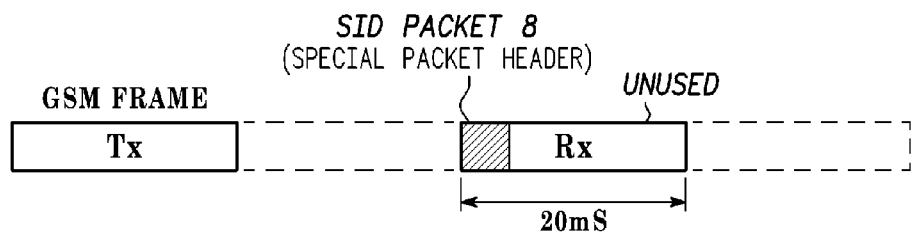
- PRIOR ART -  FIG. 3

COMMUNICATING CONVERSATIONAL DATA BETWEEN SIGNALS BETWEEN TERMINALS

FIELD OF THE INVENTION

This invention relates to communicating conversational data signals between terminals over a radio link.

BACKGROUND OF THE INVENTION

More particularly, the invention relates to communicating conversational data signals between terminals over a radio link capable of full-duplex transmission of conversational data packets. One example of this type of radio link is represented by the Bluetooth standards of the European Telecommunications Standards Institute ('ETSI'). Bluetooth is a technology that uses radio frequency (RF) transceivers to provide point-to-multipoint wireless connectivity within a personal space. Bluetooth was designed for both voice and data communication at low per-unit costs while consuming little power. To achieve the cost and power goals, Bluetooth limits connectivity to a sphere of about 10 meters (more power-hungry versions can stretch the effective range up to 100 meters) while providing a maximum data rate of 723 kbps. The communications may be used in wireless Personal Area Networks ('PAN's), to connect devices such as a portable telephone, an ear-phone/microphone head-set, a personal digital assistant, a computer, a printer and so on, for example.

Certain of these applications involve conversational communication, that is to say where data can be sent discontinuously from either one of two terminals to the other and may be unidirectional at a given moment or bidirectional. A typical example of conversational communication to which the present invention is applicable, without being limited thereto, is audio communication, in particular vocal conversation.

The present invention is particularly applicable to communication of conversational data signals of the above type in which the conversational data packets are transmitted in alternate directions within a pair of time slots, the communication comprising relatively short time periods each comprising a set of said time slots, as in Bluetooth transmissions. Patent specifications WO0241606 and WO0205593 describe communication systems of this general kind.

Cellular telephone systems, such as the Global System for Mobile communications ('GSM') system, the Digital Cellular Systems ('DCS') and the 'third generation' systems, such as Wide-band Code Division Multiple Access ('W-CDMA'), also enable conversational communication but the signals between two cellular telephones pass through a base station and these systems are not adapted to wireless Local Area Networks ('LAN's) nor PANs. The conversational data packets are not transmitted in alternate directions within sets of pairs of time slots: for GSM, DCS, WCDMA FDD the signal directions use 2 different frequencies: one for uplink & one for downlink; for WCDM TDD, uplink & downlink signals use the same frequency but time slots are not managed in pairs of time slots of the same length.

In fact there is demand for associating cellular telephones with wireless PAN or LAN links to associated devices, such as head-sets or processing devices so that communication occurs over the cellular telephone system with remote cellular telephones and is relayed to the associated head-sets or processing devices over the wireless PAN or LAN link.

Current consumption is a stringent problem in any portable application. Implementing Bluetooth or a similar communication system requires current consumption and decreases the battery life time, which is especially critical in cellular telephone applications. A second consequence is that the power management unit must be designed so that it has a sufficient maximum current capability (up to 50 mA to 100 mA additional peak current due to Bluetooth, for example): this increases the power management die size.

Another problem that can arise is that, the greater the power transmitted over the wireless PAN or LAN link, the more risk there is of interference with other wireless PAN or LAN (like a 802.11.b LAN) or with cellular telephone transmission and reception. Also, it makes sense to limit the conversational data packet flow between two wireless PAN terminals to meaningful conversational data packets only in order to allocate more bandwidth to other terminals of the same PAN, thereby improving the Quality of Service.

The present invention addresses these and other problems.

U.S. Pat. No. 6,269,331 describes communication over a GSM link in which 'comfort noise' is generated, that is to say a white noise (the comfort noise is intended to give to the listener the feeling that the call is still connected, while absolute silence in the receiver gives the user the feeling that the call has been dropped); in the system described in that patent specification, audio activity is detected and blocks of comfort noise parameters are transmitted, instead of transmitting the comfort noise itself. This patent specification does not describe a Bluetooth or similar link capable of full-duplex transmission of conversational data packets between two terminals in alternate directions within a set shorter than the phoneme time of pairs of time slots and does not minimize the current consumption of the wireless terminals.

Patent specifications EP 1 261 176 and WO 01 08426 and ETSI publication number XP-002098616 "Discontinuous Transmission (DTX) for Enhanced Full Rate (EFR) speech traffic channels" describe various ways of using voice activity detection to enhance user comfort or to reduce occupation or to make fuller use of the occupation of transmission channels. However, the technologies described do not address all the above problems of a conversational communication, especially not in the context of a communication link like Bluetooth.

SUMMARY OF THE INVENTION

The present invention provides a method of, and a terminal for, communicating conversational data signals as described in the accompanying claims.

BRIEF DESCRIPTION OF THE DRAWINGS

FIG. 1 is a schematic diagram of a communication system in accordance with one embodiment of the invention based on the Bluetooth standard, given by way of example, FIG. 2 is a diagram of HV2 signals transmitted and received in a known PAN/LAN communication system using the Bluetooth standard, FIG. 3 is a diagram of signals transmitted and received in a known cellular telephone communication system using the GSM standard.

DETAILED DESCRIPTION OF THE PREFERRED EMBODIMENTS

Figure 4:
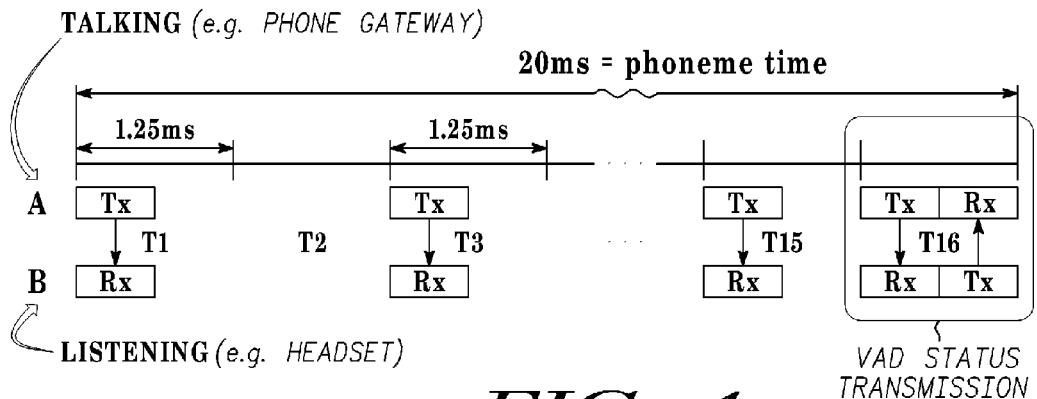
FIG. 4 is a diagram of signals transmitted and received in a PAN/LAN communication system in accordance with the embodiment of the invention illustrated in FIG. 1 based on the Bluetooth standard.

The general architecture of a system incorporating one embodiment of the present invention is shown in FIG. 1 and includes Bluetooth user terminals A and B comprising respective head-sets which include microphones 1 and 2 and earphones such as 3 and 4 respectively. The terminals A and B are in radio communication with Bluetooth access points 5 and 6 respectively, the communication between the Bluetooth access points 5 and 6 being completed by a network 7, which may include wired and/or wireless links. Each of the terminals are transceivers, that is to say that each of them includes both radio receiver and transmitter capability for the Bluetooth link.

The protocol for communication according to the present Bluetooth standards is illustrated in FIG. 2 by way of example. Data signals are transmitted between the terminals A and B over the Bluetooth radio links with full-duplex transmission. The data packets are transmitted in alternate directions within pairs of time slots such as T1 to T16, a basic phoneme period of the communication comprising a set of 16 pairs of time slots each of length 0.625 mS. The phoneme time is an audio time interval that is just too short to be distinguished by a listening user.

In conversational communication such as voice conversation, when A is talking to B then, after at most a short period of full duplex, the user B usually stops speaking and listens to A. The device A must transmit audio data, in particular voice data, and the device B must receive these audio data but there is in fact no need during unidirectional transmissions for A to enable its Bluetooth data receiver capability nor for B to enable its Bluetooth data transmitter capability in the BA time slots.

For asymmetric A to B data flow (unidirectional data flow streams from A to B), it is usually required that the device B acknowledges the received packets from A thanks to Null packets; by this means, the A Bluetooth device knows if it can transmit a new packet or if it has to repeat the previous one. In a speech Bluetooth link, however, voice packets are not acknowledged because they are not repeated. Accordingly, it is possible to switch off the B receiver and the A transmitter in the B→A time slots (and vice versa). The following scheme explains this when the headset owner is talking (the headset being the A device).

| Voice Activity Detection A | Voice Activity Detection B | Actions for the next 16 time slots | |
|---|---|---|---|
| Voice | Voice | A: Tx + Rx<br>B: Tx + Rx | Full duplex |
| No Voice | Voice | A: Rx<br>B: Tx + local comfort noise if headset | Half duplex B to A |
| Voice | No Voice | A: Tx + local comfort noise if headset<br>B: Rx | Half duplex A to B |

For this purpose, both Bluetooth devices A and B integrate a Voice Activity Detector that detects if the local Bluetooth device user is talking. The voice activity detection is synchronized between the two Bluetooth devices A and B by sending from each of the terminals A and B to the other one, during each of the phoneme periods, a conversational activity signal indicative of the detected local conversational activity at the corresponding local terminal. When voice activity is detected at only one of the terminals, the Bluetooth link (which has a full-duplex audio link capability) is implemented as a half-duplex voice Bluetooth link, starting from the next phoneme period and until voice activity is detected again at the other, silent terminal. The Bluetooth voice flow is controlled by a control mechanism responsive to the conversational activity signal that synchronizes the transmission/reception control of the two terminals A and B by transmitting and receiving periodically, once during each phoneme period, in the same time slot pair, the status of the transmitting terminal. In this way, when there is no voice activity at one of the terminals A or B, no power is transmitted for the time slot pairs within the next phoneme time, reducing the risk of collisions and interference; also the current consumption is reduced by the non-functioning transmit elements at one terminal and receive elements at the other.

A Voice Activity Detector is included in a GSM telephone and FIG. 3 shows how a Silence Insertion Descriptor ('SID') packet 8 is inserted in a GSM frame. The GSM frame comprises a transmit channel Tx and a receive channel Rx, the SID packet being included in the receive channel Rx to avoid having to transmit a white noise comfort signal and hence to reduce coder/decoder ('CODEC') calculations. Even when there is no voice activity at one of the telephones, the payload is not reduced since the transmit and receive packets are of fixed length; no reduction in the bandwidth used is obtained, nor reduction in collisions or interference; no reduction in current consumption of the radio transceivers is obtained either, since each telephone maintains transmit and receive capability during the whole frame.

FIG. 4 shows the method of this embodiment of the present invention as applied to Bluetooth communications when A is talking and B is listening: after the voice activity signal has been received so as to synchronize the control of the terminals A and B, the Bluetooth audio stream goes from A to B. The Bluetooth channel from B to A is not needed and is not used. The receiver elements of the A device are shut-down. The A device locally generates a comfort noise from a locally generated white noise signal so that the user of A does not feel that the communication link is lost when the terminal A does not receive a voice signal from B. The B microphone and associated transmit elements are shut-down.

The audio link is controlled by means of a data link (RF-COMM logical link, for example) so that each unit knows what part of its own transceiver must be turned on. The voice activity detector is enabled every 32*Ts=20 ms (Ts=625 µs, being the Bluetooth time slot). This sampling rate of the audio channel activity is the phoneme period. In this embodiment of the present invention, the voice activity signal is transmitted only by the terminal whose transmitter is active, as described above and the absence of a voice activity signal at the receiving unit is interpreted as a negative ('No Voice') activity signal; however, in another embodiment of the present invention as shown in FIG. 4, the inactive transmitter is re-activated during one slot in every phoneme period (20 mS) to transmit a negative ('No Voice') voice activity signal. During half-duplex transmission from A to B, as shown in FIG. 4, the transmitter of the terminal A is activated to transmit and the receiver of the terminal B is activated to receive in the first slot of each pair T1 to T15. The receiver of the terminal A and the transmitter of the terminal B are deactivated, so that no signals are exchanged during the second slots of each pair T1 to T15. During the last pair of time slots T16, the voice activity signal or signals are transmitted and used to control the activation/deactivation of the transmitters and receivers during the following phoneme period.

There are three kinds of Bluetooth wireless audio links (as described in the Bluetooth 1.1 standard):

HV1 link (high power, high quality)
HV2 link (mid power, mid quality)
HV3 link (low power, low quality)

When the embodiment of the present invention shown in FIG. 4 is applied to an HV2 or HV3 Bluetooth link, the HV2 or HV3 audio link is controlled by an Asynchronous Connection-less Link (ACL). VAD status are transmitted using this ACL. Ideally they are transmitted with DM1 (as described in the Bluetooth 1.1 standard) packets, which are reliable packets thanks to the inclusion of correction bits. The payload may be as short as 60 bits (5 bytes—payload header; VAD command; VAD result—CRC16-encoded with a 2/3 coding rate). When the talking Bluetooth device reads the VAD status of the listener Bluetooth device, it knows if it had to switch to receive mode, switch to full duplex mode (a relatively unusual usage case), or hold in transmit mode. As a consequence, this ACL link is used to control the audio flow.

When the embodiment of the present invention shown in FIG. 4 is applied to an HV1 Bluetooth link, once again the HV1 audio link is controlled with an ACL link that is managed by the upper stack layers. However, there are no Bluetooth time slots free to transmit this audio flow control information because an HV1 link requires the whole Bluetooth channel Bluetooth bandwidth, so the audio flow control information is transmitted using a DV packet (as defined in Bluetooth 1.1 specification), which merges audio and control data in the same packet (DV packet). The audio field is not protected with parity bits; as a consequence, there are potential errors in this audio packet. However, upwards digital processing (interpolation) can minimize the audio effects of these errors.

Figure 5:
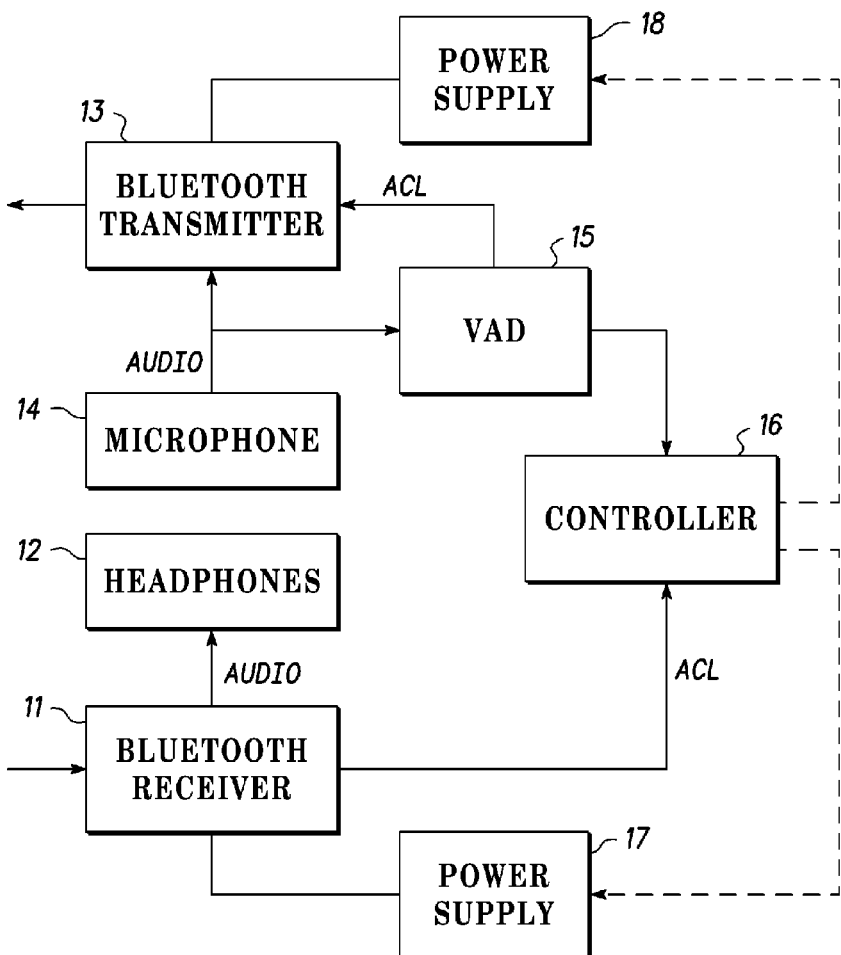
FIG. 5 is a block schematic diagram of a Bluetooth terminal in accordance with an embodiment of the invention for use in the system of FIG. 1, given by way of example.
Figure 6:
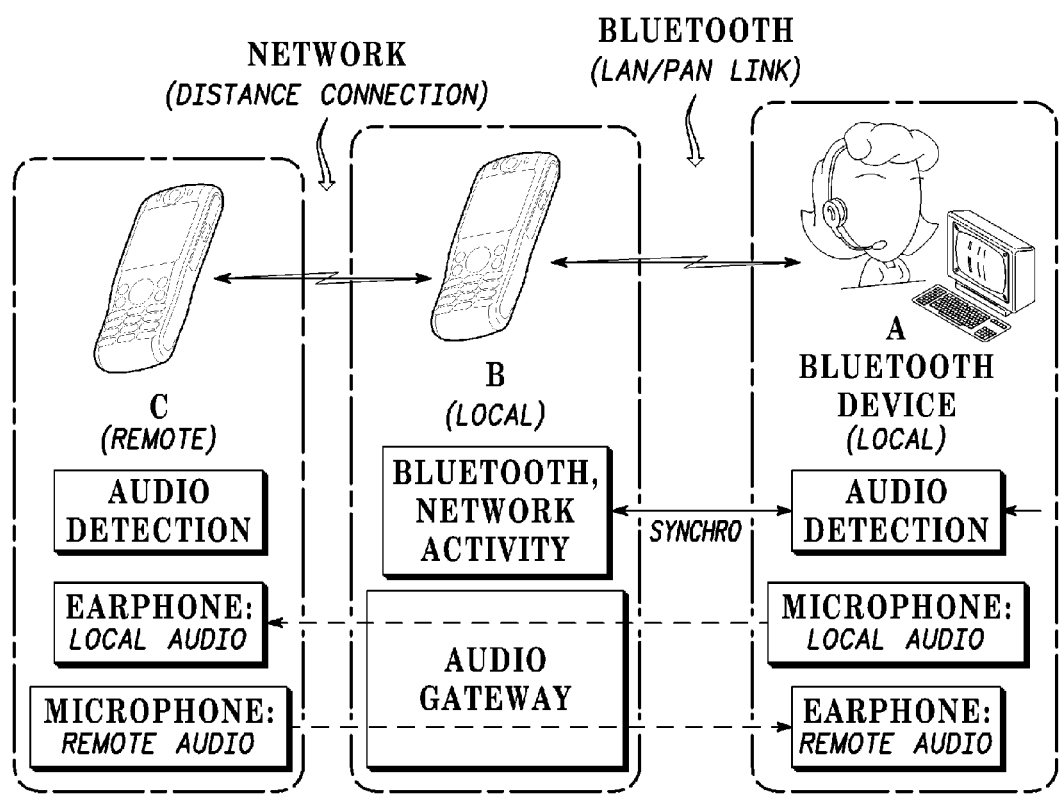
FIG. 6 is a schematic diagram of a communication system in accordance with another embodiment of the invention including a cellular telephone link and a link based on the Bluetooth standard, given by way of example.

FIG. 5 shows a Bluetooth terminal for use in the system of FIG. 1, comprising a receiver 11 connected to receive Bluetooth signals from an antenna and supply audio signals to headphones 12 and a transmitter 13 connected to transmit audio signals from a microphone 14 and transmitting Bluetooth signals through the antenna. A voice activity detector 15 detects the audio signals from the microphone 14 in each phoneme period and provides a detector signal to the transmitter 13, which transmits a corresponding local voice activity signal over the ACL Bluetooth link to the remote Bluetooth terminal with which the local terminal is in communication. The receiver 11 also detects any remote voice activity signals received over the ACL link from the remote terminal. A controller 16 responds to both the local voice activity signals and the remote voice activity signals and controls a power supply 17 to the receiver 11 and a power supply 18 to the transmitter 13.

The controller 16 responds to conversational activity occurring at a first one of the terminals (A, B) and not occurring at the second one of the terminals (B, A) by controlling the receiver 11 and transmitter 13 to communicate by half-duplex transmission of the audio packets. During the half-duplex transmission the controller 16 at least partially deactivates either the reception means in the absence of remote conversational activity or said transmission means in the absence of local conversational activity so as to reduce power consumption. The deactivation may consist of cutting off the power supply to at least part of the receiver or the transmitter. The receiver is preferably reactivated at least once per phoneme period to check for reception of any remote voice activity signals over the ACL link from the remote terminal The present invention is applicable to communication between two simple Bluetooth terminals A and B through Bluetooth access points 5 and 6 and a network 7, as in the embodiment of FIG. 1. Concerning wired networks, there are a lot of different flow control standards depending on the physical link and logical communication link types. For example, L1/N5/R2, sea & satellite standards, TCP/IP offer audio flow control facilities to reduce the needed bandwidth. As they mostly implement VAD (because of echo cancellation necessary implementation) facilities, they are compatible to work with the idea which is detailed here.

However, the invention is also applicable in a situation as shown in FIG. 5 where at least the terminal B communicates with a third terminal C over a further communication link, the terminal B signalling a conversational activity signal indicative of conversational activity generated at the third terminal C. This is the case where the terminals B and C include cellular telephone modules and the terminal B also includes a Bluetooth module of the kind described with reference to FIG. 1.

The mobile phone already includes a VAD module. It avoids transmitting silence frames through the cell-phone network during pauses or when someone else is talking. In the preferred embodiment of the invention, the silence detection is based on cumulated sound energy detection. The silence control is managed between the remote and local cell-phones using an information update through a data channel. In another embodiment of the invention, silence data packets are compressed and signalled using a "SID" packet 8, containing the silence duration information, as described with reference to FIG. 3.

In these embodiments of the invention, the mobile phone VAD and the Bluetooth wireless headset VAD are synchronized (using a VAD state information transmitted through an ACL data link) in order to determine which device is producing silence and which one is producing voice. The Local device B acts as an audio gateway between the Remote device and the Local Bluetooth device.

In full-duplex mode, each of the devices is emitting and receiving audio. There is no network optimization. This mode is unusual (because it assumes that each user is speaking without listening to the other one), except that it can happen in half-duplex modes transition (when transmission switches from C towards B to B towards C).

When C is talking to A, then after a short period of full duplex, the user A stops speaking and listens. The remote terminal C transmits audio data over the cellular telephone link and the local terminal B receives this audio data. The local terminal B transmits audio data over the Bluetooth link and the Bluetooth terminal A receives this audio data. There is then no need for B to enable its Bluetooth receiver in the A to B time slots and it is deactivated in response to the absence of detection of remote conversational activity at the terminal A from the conversational activity signals received at B over the Bluetooth link. Equally, there is no need for A to enable its transmitter in the A to B time slot and it is deactivated in response to the absence of detection of local conversational activity at the terminal A.

Conversely, when A is talking to C, then after a short period of full duplex, the user C stops speaking and listens. There is no need for A to enable its Bluetooth receiver in the B to A time slots and it is deactivated in response to the absence of detection of remote conversational activity at the terminal C from the conversational activity signals received at A over the Bluetooth link. Equally, there is no need for B to enable its transmitter in the B to A time slot and it is deactivated in response to the absence of detection of remote conversational activity at the terminal C from the conversational activity signals received at B over the cellular telephone link.

It will be appreciated that when the communication occurs between terminals all using the same communication standards (the Bluetooth standards, for example), the same activity procedure is used in synchronization between all the terminals. However, in a case such as that described with reference to FIG. 5, where communication over different links occurs using different communication standards (cellular telephone standards for the link between B a C and Bluetooth standards for the link between A and B, for example), the different activity procedures are used and the voice activity signal received in one standard is used to generate the voice activity signal to be transmitted in the other standard to obtain the synchronization between all the terminals.

What is claimed is:

1. A method of communication of conversational data signals between terminals over a radio link providing full-duplex transmission of conversational data packets in alternate directions within pairs of time slots, said communication comprising time periods, each time period comprising a set of said pairs of time slots, and said terminals comprising respective reception and transmission modules for use in processing said conversational data packets respectively received at and transmitted from the corresponding terminal, the method comprising:

sending a first conversational activity signal from a first terminal of said terminals to a second terminal of said terminals in response to detecting conversational activity local to the first terminal said terminals;

sending a second conversational activity signal from the second terminal to the first terminal in response to detecting conversational activity local to the second terminal;

controlling said reception and transmission modules to communicate by half-duplex transmission of said conversational data packets in response to conversational activity local to one of said first and second terminals but not at the other of said first and second terminals; and at least partially deactivating said reception module at said first terminal and said transmission module at said second terminal during said half-duplex transmission so as to reduce their power consumption;

wherein said local conversational activity detection is performed during each of said time periods at each of said first and second terminals, and said first and second conversational activity signals are sent from each of the first and second terminals to the other of said first and second terminals at least once during each of said time periods.

2. A method as claimed in claim 1 wherein controlling said reception module and said transmission module comprises at least partially switching off the supplies of power to said reception module and said transmission module.

3. A method as claimed in claim 2, wherein controlling said reception and transmission modules comprises generating audible comfort noise at said first terminal from a locally generated comfort noise signal during said half-duplex transmission.

4. A method as claimed in claim 2, wherein said conversational data packets are communicated without return transmission of acknowledgement signals.

5. A method as claimed in claim 1, wherein controlling said reception and transmission modules comprises generating audible comfort noise at said first terminal from a locally generated comfort noise signal during said half-duplex transmission.

6. A method as claimed in claim 1, wherein said conversational data packets are communicated without return transmission of acknowledgement signals.

7. A method as claimed in claim 1, wherein said conversational data packets comprise voice signals and the duration of said time periods corresponds to a phoneme period.

8. A method as claimed in claim 1, wherein said conversational data packets are transmitted between said terminals over said radio link substantially in conformity with the Bluetooth standard.

9. A method as claimed in claim 1, wherein said conversational activity signals are distinct from said conversational data packets.

10. A method as claimed in 1 where the first and second conversational activity signals are sent from the first and second terminals, respectively to the other of said first and second terminals in the same pair of time slots and control the half-duplex transmission direction for the next time period.

11. A method as claimed in claim 10, wherein the same activity procedure is used in synchronization between all said terminals.

12. A method as claimed in claim 10, wherein a different activity procedure is used in synchronization between one of said first and second terminals and another of said first and second terminals than between said one of said first and second terminals and a third one of said terminals.

13. A method as claimed in claim 1, wherein at least a first one of said first and second terminals communicates with a third terminal over a further communication link, said first terminal signalling a third conversational activity signal indicative of conversational activity generated at said third terminal.

14. A method as claimed in claim 13, wherein said further communication link is a cellular telephone link.

15. A first terminal for use in communication of conversational data signals with a second terminal over a radio link, said first terminal comprising:

reception and transmission modules providing full-duplex reception and transmission of conversational data packets in alternate directions within pairs of time slots, said communication comprising time periods each comprising a set of said pairs of time slots, a conversational activity detector for detecting conversational activity local to said first terminal, a signalling module for sending in each of said time periods a conversational activity signal indicative of the local conversational activity at said first terminal to said second terminal and for receiving in each of said time periods a conversational activity signal indicative of a conversation activity local to said second terminal, and a control module responsive to conversational activity occurring local to the first terminal and not occurring at the second terminals for controlling said reception and transmission modules to communicate by half-duplex transmission of said conversational data packets and for at least partially deactivating during said half-duplex transmission said reception module in the absence of remote conversational activity and said transmission module in the absence of local conversational activity so as to reduce power consumption;

wherein said local conversational activity detection is performed during each of said time periods at each of said first and second terminals, and said first and second conversational activity signals are sent from each of the first and second terminals to the other of said first and second terminals at least once during each of said time periods.

16. A terminal as claimed in claim 15 wherein said control module comprises an element for at least partially switching off the supplies of power to said reception module and said transmission module when deactivated during said half-duplex transmission.

17. A terminal as claimed in claim 15, wherein said control module comprises an element for generating audible comfort noise from a locally generated comfort noise signal during said half-duplex transmission.

* * * * *